United States Patent [19]

Lee et al.

[11] Patent Number: 5,124,787
[45] Date of Patent: Jun. 23, 1992

[54] VERTICAL/HORIZONTAL CONTOUR CORRECTION SYSTEM

[75] Inventors: Ho U. Lee, Kyungki; Sang H. Oh, Seoul, both of Rep. of Korea

[73] Assignee: Goldstar Co., Ltd., Seoul, Rep. of Korea

[21] Appl. No.: 733,131

[22] Filed: Jul. 19, 1991

[30] Foreign Application Priority Data

Jul. 21, 1990 [KR] Rep. of Korea ............ 11138/1990

[51] Int. Cl.$^5$ ............................................. H04N 11/20
[52] U.S. Cl. ....................................... 358/37; 358/11
[58] Field of Search ....................... 358/37, 166, 11

[56] References Cited

U.S. PATENT DOCUMENTS

| | | | |
|---|---|---|---|
| 4,365,266 | 12/1982 | Lagoni | 358/31 |
| 4,386,434 | 5/1983 | Gibson et al. | 358/37 |
| 4,558,347 | 12/1985 | Pritchard et al. | 358/37 |
| 4,754,322 | 6/1988 | Okuda et al. | 358/37 |

*Primary Examiner*—James J. Groody
*Assistant Examiner*—Kim Yen Vu

[57] ABSTRACT

A vertical/horizontal contour correction system comprising a vertical contour correction arrangement for separating a luminance signal Y and a chromaticity signal C from a composite video signal inputted therein, performing a vertical contour correction with respect to the chromaticity and luminance signals C and Y and outputting signals Y', I' and Q', each of vertical contours of which has been corrected; and a horizontal contour correction arrangement for inputting said signals Y', I' and Q' from the vertical contour correction performing a horizontal contour correction with respect to the signals Y', I' and Q' and outputting signals Y", I" and Q", each of horizontal contours of which has been corrected. Therefore, the present system is capable of performing the vertical/horizontal contour corrections with reference to both the luminance signal and the chromaticity signal so that an image to be displayed on the screen can be presented more distinctly to the viewer.

3 Claims, 5 Drawing Sheets

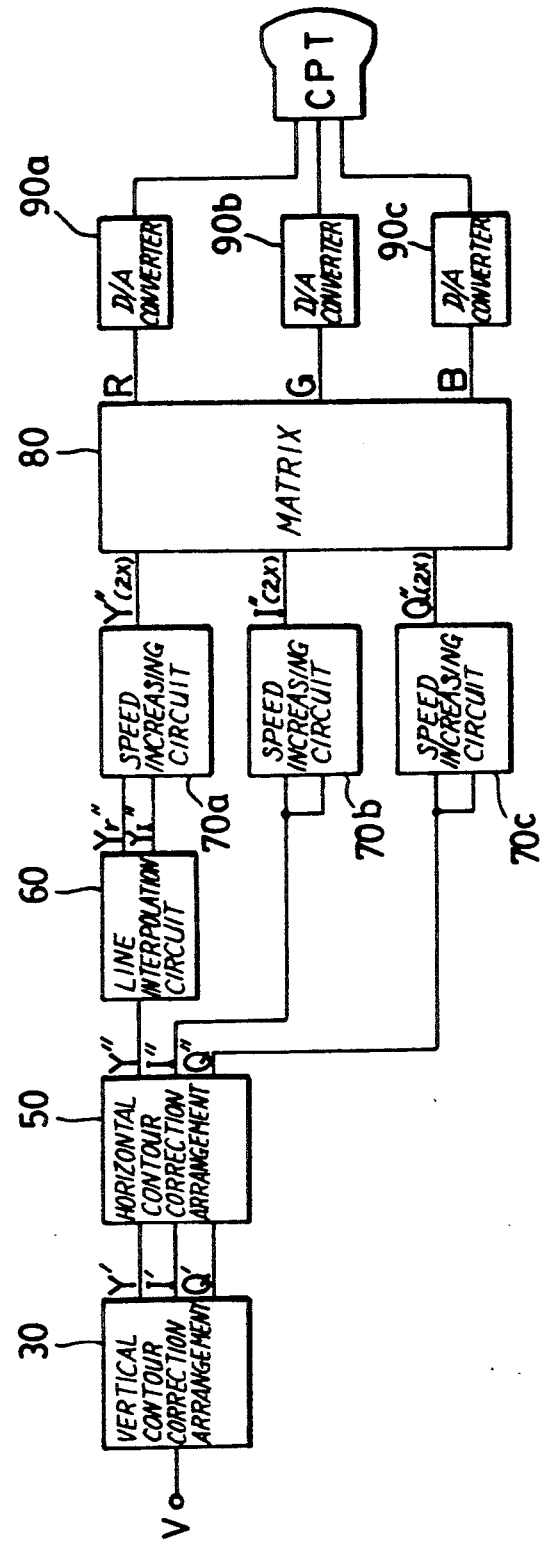

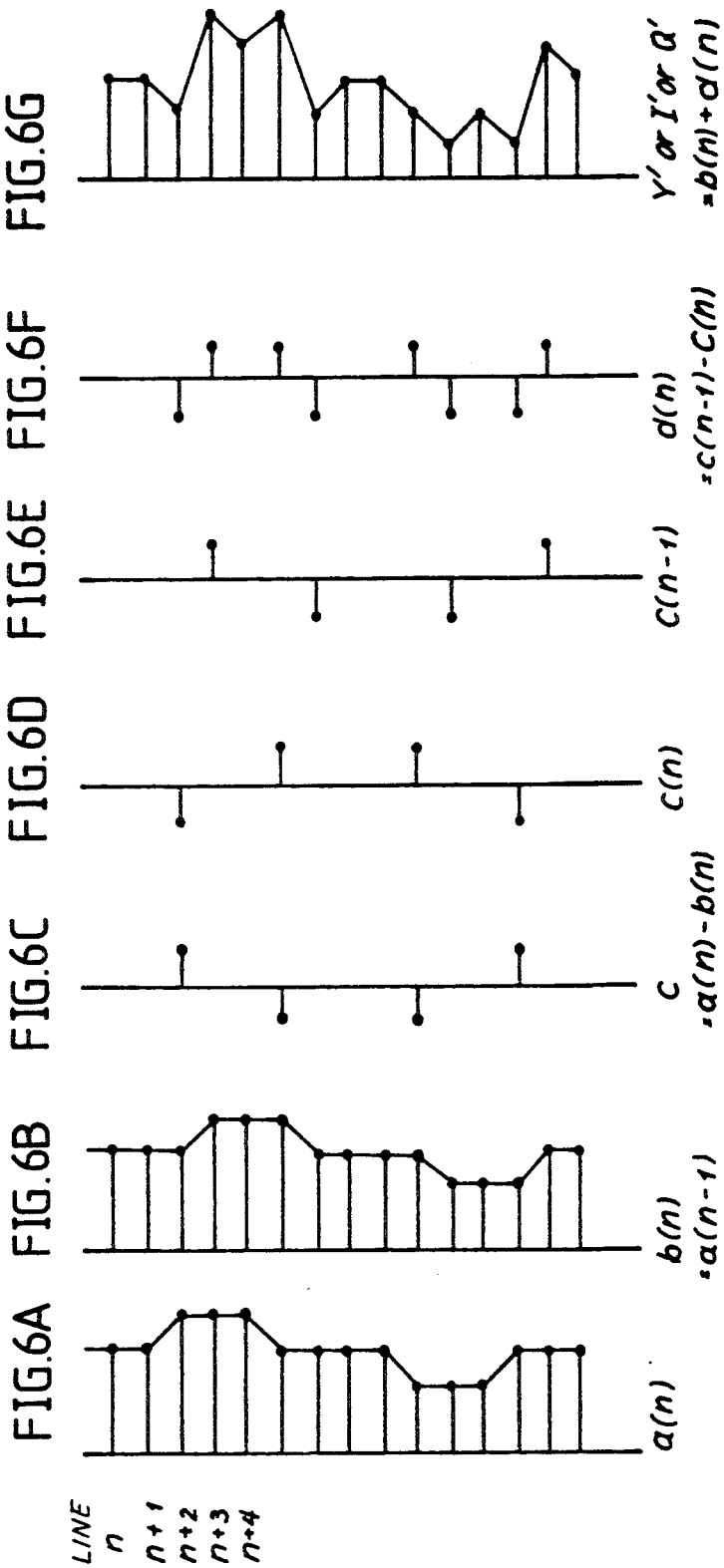

VERTICAL/HORIZONTAL CONTOUR CORRECTION SYSTEM

BACKGROUND OF THE INVENTION

The present invention relates in general to a contour correction system, and more particularly to a vertical/horizontal contour correction system for performing a contour correction with reference to a luminance signal and a chromaticity signal so that their vertical resolutions are identical to each other and then performing a contour correction with reference to the chromaticity signal so that its horizontal resolution is identical to that of the luminance signal.

Referring to FIG. 1, there is shown a block diagram of a conventional horizontal contour correction system. As shown in this drawing, the conventional horizontal contour correction system comprises a comb filter 1 for separating from a composite video signal CV inputted thereto a chromaticity signal C and a wide-band luminance signal Yw with a separated luminance signal Y being combined with fine vertical components contained in a color signal component.

A luminance signal $Y_L$ of low-pass component is extracted from the wide-band luminance signal Yw by passing the wide-band luminance signal Yw through a low-pass filter 2 and is applied to a subtracter 3. Upon receiving the luminance signal $Y_L$ of low-pass component, the subtracter 3 subtracts the luminance signal $Y_L$ of low-pass component from the wide-band luminance signal Yw to output a luminance signal $Y_B$ of high-pass component to a gain controller 4. The gain controller 4 controls the gain of the received luminance signal $Y_B$ of high-pass component by an appropriate level to generate an emphasized luminance signal $Y_M$. Then, an adder 5 adds the emphasized luminance signal $Y_M$ to the wide-band luminance signal Yw to output to a scanning line interpolator 6 a high-pass component emphasized luminance signal $Y_p$, i.e., a signal, a horizontal contour of which has been corrected. The interpolator 6 inserts the received horizontal contour corrected signal $Y_p$ into a scanning line to output luminance signals $Y_R$ and $Y_I$. Herein, the luminance signal $Y_R$ is a real signal being read from a memory and the luminance signal $Y_I$ is an image signal being produced by comparing the received horizontal contour corrected signal $Y_p$ with a reference signal.

On the other hand, referring to FIG. 2, there is shown a block diagram of a conventional vertical/horizontal contour correction system. The illustrated system performs vertical/horizontal, two-dimensional contour corrections respectively with respect to the original signal, or wide-band luminance signal Yw and the screen adaptable interpolation signal, or luminance signal $Y_I$. Herein, procedures of processing the original signal Yw and the screen adaptable interpolation signal $Y_I$ are, the same and hence only the vertical/horizontal contour corrections with reference to the screen adaptable interpolation signal $Y_I$ will be described.

The conventional vertical/horizontal contour correction system comprises a line delayer 7 for delaying the received wide-band luminance signal Yw by one line and outputting a one line delayed wide-band luminance signal Yw−1 to an adder 9. The adder 9 adds the received one line delayed wide-band luminance signal Yw−1 to the wide-band luminance signal Yw to output a predetermined signal to a multiplier 10. Upon receiving the predetermined signal, the multiplier 10 performs a desired multiplying operation to output a mean luminance signal $Y_{WL}$.

Upon receiving the mean luminance signal $Y_{WL}$, a subtracter 19 subtracts the mean luminance signal $Y_{WL}$ from the screen adaptable interpolation signal, or luminance signal $Y_I$ to calculate a line difference Δ E2, which is again added to the original luminance signal $Y_I$ by an adder 20. As a result, a vertical contour of the screen adaptable interpolation signal, or luminance signal $Y_I$ is corrected.

On the other hand, a band-pass filter 21 inputs an output signal from the adder 20 to extract a high frequency signal component from the output signal from the adder 20. Such extracted high frequency signal is inputted to a gain controller 22 for control of the gain thereof and is then added to the original luminance signal $Y_I$ by an adder 23. Then outputted from the adder 23 is a luminance signal $Y_{IP}$ in which the high frequency component is reinforced. As a result, the luminance signal $Y_{IP}$ is added to the chromaticity signal C separated by the comb filter 1 by a first matrix 27, which then outputs three color signals $R_I$, $G_I$ and $B_I$.

However, the conventional vertical/horizontal contour correction system has a disadvantage, in that an image to be displayed on the screen cannot be presented distinctly to the viewer since the system performs the vertical/horizontal, two-dimensional contour corrections only with respect to the luminance signal.

SUMMARY OF THE INVENTION

Therefore, it is an object of the present invention to provide a vertical/horizontal contour correction system for performing vertical/horizontal contour corrections with reference to both a luminance signal and a chromaticity signal so that an image to be displayed on the screen can be presented more distinctly to the viewer.

In accordance with the present invention, the object can be accomplished by providing a vertical/horizontal contour correction system, comprising: vertical contour correction means for separating a luminance signal Y and a chromaticity signal C from a composite video signal inputted therein, performing a vertical contour correction with respect to said chromaticity and luminance signals C and Y and outputting signals Y′, I′ and Q′, each of vertical contours of which has been corrected; horizontal contour correction means for inputting said signals Y′, I′ and Q′ from said vertical contour correction means, performing a horizontal contour correction with respect to said signals Y′, I′ and Q′ and outputting signals Y″, I″ and Q″, each of horizontal contours of which has been corrected; line-interpolating means for inputting said signal Y″ from said horizontal contour correction means and line-interpolating the inputted signal Y″ to output signals Yr″ and $Y_I$″; first speed increasing means for increasing a conversion speed of said signals Yr″ and $Y_I$″ outputted from said line-interpolating means to output a signal Y″(2x); second speed increasing means for increasing a conversion speed of said signal I″ outputted from said horizontal contour correction means to output a signal I″(2x); third speed increasing means for increasing a conversion speed of said signal Q″ outputted from said horizontal contour correction means to output a signal Q″(2x); matrix means for outputting three color signals R, G and B in response to said signals Y″(2x), I″(2x) and Q″(2x) outputted respectively from said first through third speed increasing means; and first through third digital/analog converting means for converting respectively said color signals R, G and B outputted from said matrix means into an analog signal and outputting the analog signals to a color picture tube.

BRIEF DESCRIPTION OF THE DRAWINGS

The above and other objects, features and advantages of the present invention will be more clearly understood from the following detailed description taken in conjunction with the accompanying drawings, in which:

FIG. 5 is a block diagram of the whole of the vertical/horizontal contour correction system of the present invention; and FIGS. 6A through 6G are waveform diagrams illustrating a process by the vertical contour correction arrangement in FIG. 3.

DETAILED DESCRIPTION OF PREFERRED EMBODIMENTS

First, a construction of a vertical/horizontal contour correction system of the present invention will be described with reference to FIGS. 3 through 5.

Figure 3:
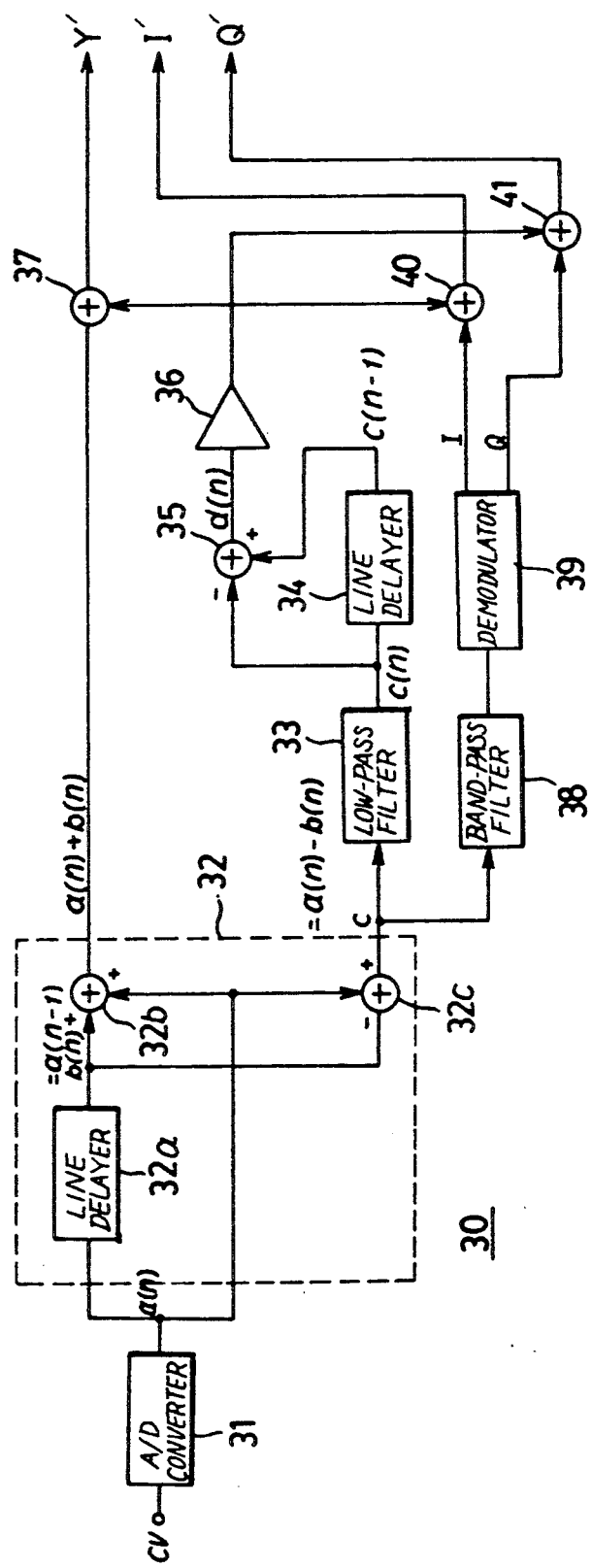
FIG. 3 is a block diagram of a vertical contour correction arrangement in a vertical/horizontal contour correction system of the present invention.

Referring to FIG. 3, there is shown a block diagram of a vertical contour correction arrangement 30 in the vertical/horizontal contour correction system of the present invention. In this drawing, the vertical contour correction arrangement 30 is shown to comprise an analog/digital (A/D) converter 31 for converting an analog composite video signal CV inputted thereto into a digital signal, and a comb filter 32 including a line delayer 32a, an adder 32b and a subtracter 32c, for separating a luminance signal Y and a chromaticity signal C from an output signal from the analog/digital converter 31.

Also, the vertical contour correction arrangement 30 comprises a low-pass filter 33 for passing only signal below a predetermined cut-off frequency 1.5 MHz in the chromaticity signal C from the comb filter 32, a line delayer 34 for delaying an output signal from the low-pass filter 33 by one line, a subtracter 35 for subtracting an output signal from the line delayer 34 from the output signal from the low-pass filter 33 to output a desired signal, a gain controller 36 for controlling the gain of the signal outputted from the subtracter 35, an adder 37 for adding an output signal from the gain controller 36 to the luminance signal Y from the comb filter 32 to output a luminance signal Y', a vertical contour of which has been corrected, a band-pass filter 38 for passing only signal within a predetermined frequency band in the chromaticity signal C from the comb filter 32, a demodulator 39 for demodulating an output signal from the band-pass filter 38 to output signals I and Q, an adder 40 for adding the output signal from the gain controller 36 to the signal I outputted from the demodulator 39 to output a signal I', a vertical contour of which has been corrected, and an adder 41 for adding the output signal from the gain controller 36 to the signal Q outputted from the demodulator 39 to output a signal Q', a vertical contour of which has been corrected.

Figure 1:
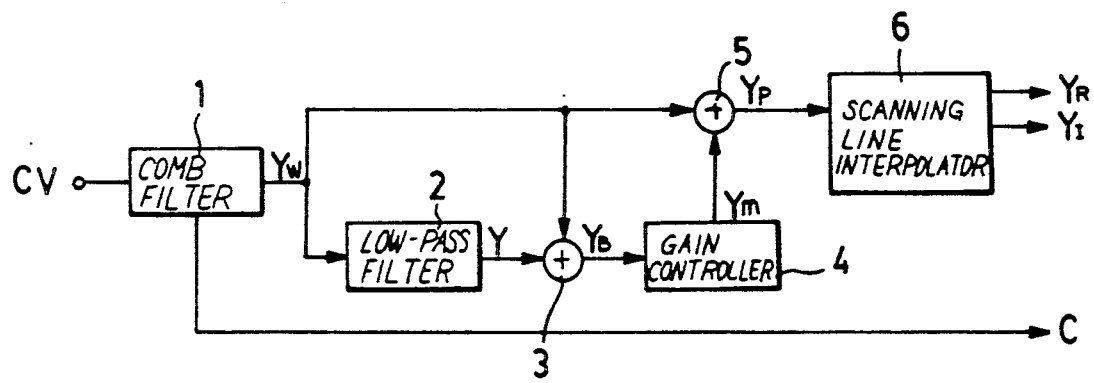
FIG. 1 is a block diagram of a conventional horizontal contour correction system.
Figure 4:
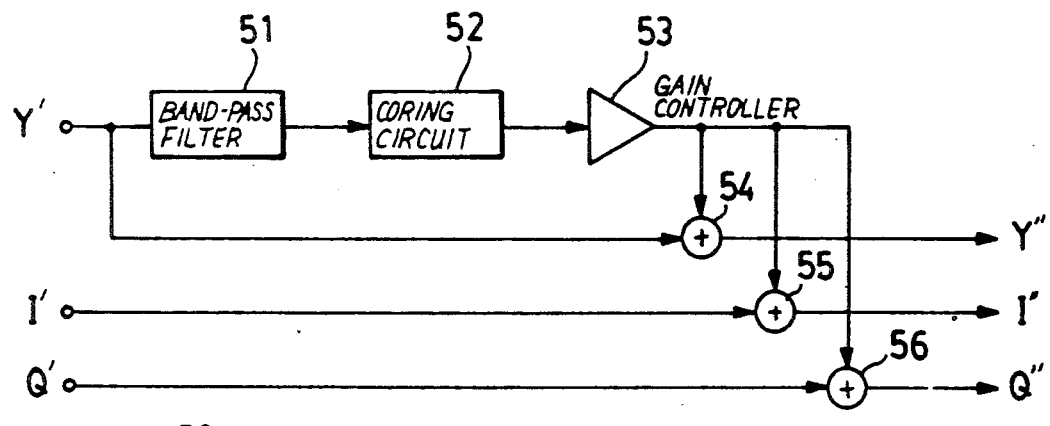
FIG. 4 is a block diagram of a horizontal contour correction arrangement in the vertical/horizontal contour correction system of the present invention.
Figure 2:
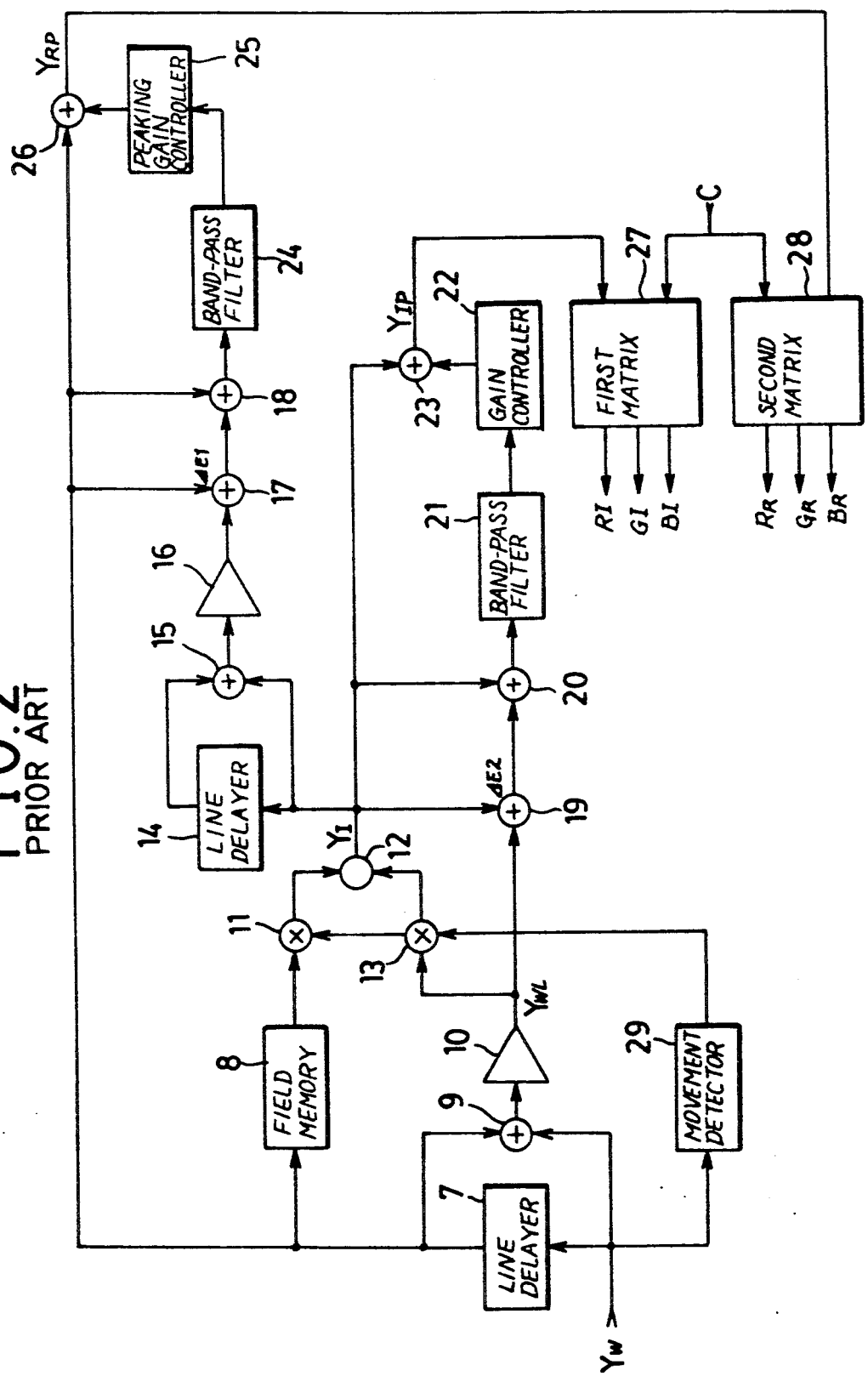
FIG. 2 is a block diagram of a conventional vertical/horizontal contour correction system.

With reference to FIG. 4, there is shown a block diagram of a horizontal contour correction arrangement 50 in the vertical/horizontal contour correction system of the present invention. As shown in this drawing, the horizontal contour correction arrangement 50 comprises a band-pass filter 51 for inputting the luminance signal Y' from the vertical contour correction arrangement 30 and passing only signal within a predetermined frequency band in the inputted luminance signal Y', a coring circuit 52 for coring an output signal from the band-pass filter 51, a gain controller 53 for controlling the gain of an output signal from the coring circuit 52, an adder 54 for adding an output signal from the gain controller 53 to the luminance signal Y' from the vertical contour correction arrangement 30 to output a signal Y", a horizontal contour of which has been corrected, an adder 55 for adding the output signal from the gain controller 53 to the signal I' from the vertical contour correction arrangement 30 to output a signal I", a horizontal contour of which has been corrected, and an adder 56 for adding the output signal from the gain controller 53 to the signal Q' from the vertical correction arrangement 30 to output a signal Q", a horizontal contour of which has been corrected.

With reference to FIG. 5, there is shown a block diagram of the whole of the vertical/horizontal contour correction system of the present invention. As shown in the drawing, the vertical/horizontal contour correction system of the present invention comprises, in addition to the vertical contour correction arrangement 30 which inputs the composite video signal CV, performs the vertical contour correction with respect to the chromaticity and luminance signals C and Y and outputs the signals Y', I' and Q' and the horizontal contour correction arrangement 50 which inputs the signals Y', I' and Q' from the vertical contour correction arrangement 30, performs the horizontal contour correction with respect to the signals Y', I' and Q' and outputs the signals Y", I" and Q", a line-interpolating circuit 60 for inputting the signal Y" from the horizontal contour correction arrangement 50 and line-interpolating the inputted signal Y" to output signals Yr" and Y$_I$", a first speed increasing circuit 70a for increasing a conversion speed of the signals Yr" and Y$_I$" outputted from the line-interpolating circuit 60 to output a signal Y"'(2x), a second speed increasing circuit 70b for increasing a conversion speed of the signal I" outputted from the horizontal contour correction arrangement 50 to output a signal I"(2x), a third speed increasing circuit 70c for increasing a conversion speed of the signal Q" outputted from the horizontal contour correction arrangement 50 to output a signal Q"(2x), a matrix 80 for outputting three color signals R, G and B in response to the signals Y"'(2x), I"(2x) and Q"(2x) outputted respectively from the first through the third speed increasing circuits 70a, 70b and 70c, a first digital/analog (D/A) converter 90a for converting the color signal R outputted from the matrix 80 into an analog signal and outputting the analog signal to a color picture tube CPT, a second digital/analog converter 90b for converting the color signal G outputted from the matrix 80 into an analog signal and outputting the analog signal to a color picture tube CPT, and a third digital/analog converter 90c for converting the color signal B outputted from the matrix 80 into an analog signal and outputting the analog signal to a color picture tube CPT.

Next, the operation of the vertical/horizontal contour correction system with the above-mentioned construction in accordance with the present invention will be described in detail with reference to FIGS. 6A through 6G.

First, the operation of the vertical contour correction arrangement 30 in the vertical/horizontal contour correction system of the present invention will be mentioned.

Upon receiving a composite video signal CV, the A/D converter 31 converts the analog composite video signal CV inputted thereto into a digital composite signal as shown in FIG. 6A, which is then delayed by one line by the line delayer 32a. As a result, the line delayer 32a outputs a signal as shown in FIG. 6B. The adder 32b adds the output signal from the A/D converter 31 to the output signal from the line delayer 32a, so as to output a luminance signal Y.

On the other hand, the subtracter 32c subtracts the output signal from the line delayer 32a from the output signal from the A/D onverter 31, so as to output a chromaticity signal C as shown in FIG. 6C. Upon being applied with the chromaticity signal C outputted from the subtracter 32c, the low-pass filter 33 passes only signal below the self cut-off frequency 1.5 MHz in the chromaticity signal C and thus outputs a signal as shown in FIG. 6D. This output signal from the low-pass filter 33 is applied directly to the subtracter 35, while at the same time is delayed by one line by the line delayer 34 as shown in FIG. 6E and then applied to the subtracter 35. As a result, the subtracter 35 outputs a signal as shown in FIG. 6F.

Then, the gain controller 36 controls the gain of the signal outputted from the subtracter 35 by a predetermined level and outputs the gain controlled signal to the adder 37. Upon receiving the output signal from the gain controller 36, the adder 37 adds the output signal from the gain controller 36 to the luminance signal Y from the adder 32c to output at its output terminal a luminance signal Y', the vertical contour of which has been corrected, as shown in FIG. 6G.

On the other hand, the band-pass filter 38 passes only signal within a predetermined frequency band in the chromaticity signal C from the subtracter 32c and the demodulator 39 demodulates the output signal from the band-pass filter 38 to output at its output terminals signals I and Q respectively to the adders 40 and 41. Upon being applied with the signals I and Q, the adders 40 and 41 add the output signal from the gain controller 36 respectively to the signals I and Q to output signals I' and Q' respectively, each of vertical contours of which has been corrected, as shown in FIG. 6G.

The signals Y', I' and Q', each of vertical contours of which has been corrected, as mentioned above are applied from the vertical contour correction arrangement 30 to the horizontal contour correction arrangement 50 for correction of the horizontal contour.

Now, the operation of the horizontal contour correction arrangement 50 in the vertical/horizontal contour correction system of the present invention will be described.

Upon receiving the luminance signal Y' from the vertical contour correction arrangement 30, the band-pass filter 51 passes only signal within a predetermined frequency band in the inputted luminance signal Y' and the coring circuit 52 cores the output signal from the band-pass filter 51 to output at its output terminal a signal above a predetermined threshold value to the gain controller 53.

The gain controller 53 controls the gain of the signal outputted from the coring circuit 52 by a predetermined level and outputs the gain controlled signal respectively to the adders 54 through 56. Upon receiving the output signal from the gain controller 53, the adders 54 through 56 add the output signal from the gain controller 53 respectively to the signals Y', I' and Q' from the vertical contour correction arrangement 30 to output at respective output terminals signals Y'', I'' and Q'', each of horizontal contours of which has been corrected.

Next, the signals Y'', I'' and Q'' outputted from the horizontal contour correction arrangement 50 will color-processed by additional devices in the vertical/horizontal contour correction system of the present invention as shown in FIG. 5.

First, the luminance signal Y'' from the horizontal contour correction arrangement 50 is inputted and line-interpolated by the line-interpolating circuit 60, which then applies signals Yr'' and Yf'' to the speed increasing circuit 70a, while the signals I'' and Q'' from the horizontal contour correction arrangement 50 are applied directly respectively to the speed increasing circuits 70b and 70c.

The speed increasing circuits 70a through 70c increase a conversion speed of each of the inputted signals Yr'' and Yf'', I'' and Q'' to output respectively signal Y'' (2x), I'' (2x) and Q'' (2x) to the matrix 80. Upon receiving the signals Y'' (2x), I'' (2x) and Q'' (2x) from the speed increasing circuits 70a through 70c, the matrix 80 outputs three color signals R, G and B at respective output terminals to the D/A converters 90a through 90c. Finally, the three color signals R, G and B from the matrix 80 are respectively converted into an analog signal by the D/A converters 90a through 90c for applying the analog signals to the color picture tube CPT.

As hereinbefore described, in accordance with the present invention, there is provided the vertical/horizontal contour correction system which is capable of performing the contour correction with reference to the luminance signal and the chromaticity signal so that their vertical resolutions are identical to each other and then perform the contour correction with reference to the chromaticity signal so that its horizontal resolution is identical to that of the luminance signal. Therefore, an image to be displayed on the screen can be presented more distinctly to the viewer.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. A vertical/horizontal contour correction system comprising:
   vertical contour correction means for separating a luminance signal and a chromaticity signal from a composite video signal inputted therein, for performing a vertical contour correction with respect to said chromaticity and luminance signals, and for outputting signals Y', I', and Q', each having corrected vertical contours;
   horizontal contour correction means for receiving said signals Y', I', and Q' from said vertical contour correction means, for performing a horizontal contour correction with respect to said signals Y', I', and Q' and for outputting signals Y''', I''', and Q''', each having corrected horizontal contours;

line-interpolating means for receiving said signal Y''' from said horizontal contour correction means and for line-interpolating signal Y''' to output signals Yr''' and Y$_I$''';

first speed increasing means for increasing a conversion speed of said signals Yr''' and Y$_I$''' outputted from said line-interpolating means to output a signal Y''' (2x);

second speed increasing means for increasing a conversion speed of said signal I''' outputted from said horizontal contour correction means to output a signal I''' (2x);

third speed increasing means for increasing a conversion speed of said signal Q''' outputted from said horizontal contour correction means to output a signal Q''' (2x);

matrix means for outputting three color signals in response to said signals Y''' (2x), I''' (2x) and Q''' (2X), outputted respectively from said first, second, and third speed increasing means; and digital/analog converting means for converting said color signals outputted from said matrix means into analog signals and for outputting said analog signals to a color picture tube.

2. A vertical/horizontal contour correction system, as set forth in claim 1, wherein said vertical contour correction means includes:

an analog/digital converter for converting said analog composite video signal inputtted therein into a digital signal;

a first line delayer for delaying an output signal from said analog/digital converter by one line;

a first adder for adding said output signal from said analog/digital converter and an output signal from said first line delayer to output said luminance signal;

a first subtracter for subtracting said output signal from said first line delayer from said output signal from said analog/digital converter to output said chromaticity signal;

a low-pass filter for passing only frequencies of said chromaticity signal which are below a predetermined cut-off frequency;

a second line delayer for delaying an output signal from said low-pass filter by one line;

a second subtracter for subtracting an output signal from said second line delayer from said output signal from said low-pass filter to output a signal;

a gain controller for controlling a gain of said signal outputted from said second subtracter;

a second adder for adding an output signal from said first gain controller and said luminance signal to output said signal Y', the vertical contour of which has been corrected;

a band-pass filter for passing only frequencies of said chromaticity signal which are within a predetermined frequency band;

a demodulator for demodulating an output signal from said first band-pass filter to output signals I and Q;

a third adder for adding said output signal from said first gain controller and said signal I outputted from said demodulator to output said signal I', the vertical contour of which has been corrected; and a fourth adder for adding said output signal from said first gain controller and said signal Q outputted from said demodulator to output said signal Q', the vertical contour of which has been corrected.

3. A vertical/horizontal contour correction system, as set forth in claim 1, wherein said horizontal contour correction means includes:

a band-pass filter for inputting said signal Y' from said vertical contour correction means and for passing only frequencies of said signal Y' which are within a predetermined frequency band;

a coring circuit for coring an output signal from said band-pass filter to output a signal above a predetermined threshold value;

a gain controller for controlling a gain of said signal outputted from said coring circuit;

a first adder for adding an output signal from said gain controller and said signal Y' from said vertical contour correction means to output said signal Y''', the horizontal contour of which has been corrected;

a second adder for adding the signal outputted from said gain controller and said signal I' from said vertical contour correction means to output said signal I''', the horizontal contour of which has been corrected; and a third adder for adding the signal outputted from said gain controller and said signal Q' from said vertical contour correction means to output said signal Q''', the horizontal contour of which has been corrected.

* * * * *